United States Patent [19]

Dugger

[11] Patent Number: 4,842,451
[45] Date of Patent: Jun. 27, 1989

[54] DEBURRING DRILL BIT

[76] Inventor: Ben A. Dugger, 5738 Blueridge Dr., Columbus, Ga. 31907

[21] Appl. No.: 156,903

[22] Filed: Feb. 5, 1988

[51] Int. Cl.$^4$ .............................................. B23B 51/08
[52] U.S. Cl. ...................................... 408/21; 408/211; 408/230; 408/714
[58] Field of Search ............... 408/714, 127, 224, 225, 408/230, 144, 21

[56] References Cited

U.S. PATENT DOCUMENTS

| | | | |
|---|---|---|---|
| 1,471,866 | 10/1923 | Simpson | 408/224 |
| 3,298,256 | 1/1967 | Cogsdill | 408/714 X |
| 4,343,577 | 8/1982 | Purdon | 408/714 X |
| 4,589,805 | 5/1986 | Duffner | 408/714 X |

FOREIGN PATENT DOCUMENTS 0143905  8/1983  Japan .................................. 408/144

*Primary Examiner*—Z. R. Bilinsky
*Attorney, Agent, or Firm*—Michael C. Smith

[57] ABSTRACT

A deburring drill bit having a shank, an elongated shaft, a drill bit head having forward drilling surfaces formed in the head, and rearward deburring surfaces formed behind said forward drilling surfaces, whereby drilling and deburring can be performed in a single operation, the drilling surfaces having a first longitudinal axis and the deburring surfaces having a second longitudinal axis not coincident with said first longitudinal axis.

4 Claims, 1 Drawing Sheet

DEBURRING DRILL BIT

TECHNICAL FIELD

The present invention relates generally to drills, and specifically to a drill bit, and more specifically to a deburring drill bit.

BACKGROUND ART

Deburring drills and similar deburring mechanisms are well known in the art. Examples are shown in U.S. Pat. Nos. 4,165,200; 2,053,253; 2,427,816; 2,364,688; 2,154,560; 1,095,185; 810,602; 727,580; 3,018,675; 2,429,382; and 835,125. Other examples are shown in East German Pat. No. 231,307 and German Pat. No. 2,713,529.

While the varieties of deburring devices and similar mechanisms referred to above are apparently effective at their particular uses, until the present invention there has been no deburring drill bit having a drilling bit and a deburring bit as part of the same drill bit for use in drilling and deburring a predetermined aperture to allow for the combination of both operations into a single operation. It is for this reason that the present deburring drill bit was invented.

DISCLOSURE OF INVENTION

The present invention promotes quick, efficient drilling and deburring of an aperture in a single operation. The present invention is a deburring drill bit having a shank, an elongated shaft, a drill bit head having forward drilling surfaces formed in the head, and rearward deburring surfaces formed behind said forward drilling surfaces, whereby drilling and deburring can be performed in a single operation, the drilling surfaces having a first longitudinal axis and the deburring surfaces having a second longitudinal axis not coincident with said first longitudinal axis. The preferred deburring drill bit is one having an bent elongated shaft, a bit head having a circumference equal to the circumference shaft and concentric with the shaft, a forward cutting edge, and a rearward deburring edge formed in a relief notch on the side of the drill bit.

Thus, a primary object of the present invention is to provide a deburring drill bit having the drilling and deburring surfaces on the same bit to provide for combination of the drilling and deburring steps into a single operation.

BRIEF DESCRIPTION OF THE DRAWINGS

While the specification concludes with claims particularly pointing out and distinctly claiming the subject matter which is regarded as the invention, it is believed that the invention, objects, features, and advantages thereof will be better understood from the following description taken in connection with the accompanied drawings in which like parts are given like identification numerals and wherein:

BEST MODE FOR CARRYING OUT THE INVENTION

Figure 1:
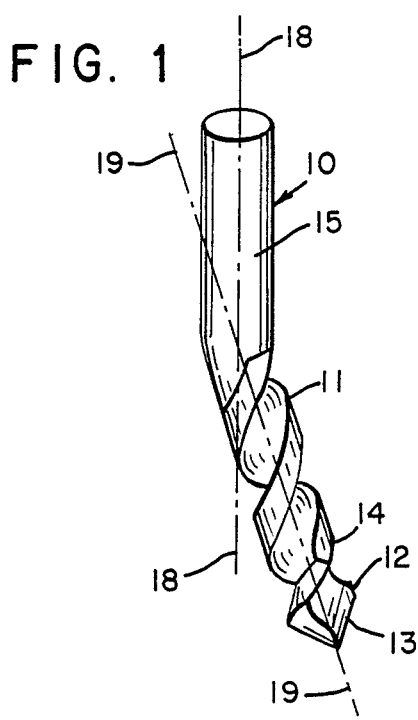
FIG. 1 is a perspective drawing of a first embodiment of the present invention.

While there are many ways of drilling and deburring apertures, the method used in connection with the present invention is called the one step method. This method is a method of drilling and deburring an aperture with a drill bit having forward cutting surfaces formed in the front edge thereof and rearward deburring surfaces formed behind said cutting surfaces in a single operation comprising the steps of: (a) rotating said forward cutting surfaces about a first predetermining longitudinal axis; and (b) rotating said rearward deburring surfaces about a second predetermined longitudinal axis, said second axis being not coincident with said first axis. This apparatus is an apparatus for drilling and deburring an aperture in a single operation comprising: (a) a drill bit 10 having forward cutting surfaces 13 formed in the front edge thereof and rearward deburring surfaces 14 formed behind said cutting surfaces 13; (b) means for rotating said forward cutting surfaces 13 about a first predetermining longitudinal axis 18; and (c) means for rotating said rearward deburring surfaces 14 about a second predetermined longitudinal axis 19, said second axis 19 being not coincident with said first axis 18.

For purposes of this specification, an offset drill bit is defined as a drill having a bent or an eccentric bit having a longitudinal axis different from the longitudinal axis of the drill bit shank, a drill bushing is defined as a hardened guide which forces the drill bit into a predetermined position, and a drill fixture is defined as a device for rigidly holding an object part in a specific position for drilling thereof.

Figure 2:
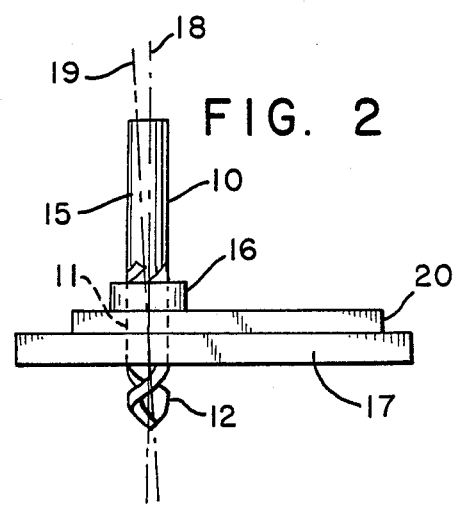
FIG. 2 is a side drawing of a first embodiment of the present invention showing the device in operation.

FIGS. 1 and 2 show a first preferred embodiment of this invention 10 including apparatus for drilling and deburring an aperture in a single operation comprising: (a) s shank 15 having a first longitudinal axis 18; (b) an elongated shaft 11 secured to said shank 15 and having a second longitudinal axis 19 not coincident with said first longitudinal axis 18; (c) a drill bit head 12 secured to said shaft 11 having a longitudinal axis coincident with said second longitudinal axis 19; (d) drilling surfaces 13 formed in the forward edge of said head 12, said drilling surfaces 13 having a longitudinal axis coincident with said second longitudinal axis 19; (e) deburring surfaces 14 formed in the side of said shaft 15, said deburring surfaces 14 having a longitudinal axis coincident with said first longitudinal axis 18. The first longitudinal axis 18 and the second longitudinal axis 19 are angularly disposed up to five degrees from each other. The angle is preferably from one degree to three degrees. The longitudinal axes 18 and 19 intersect at the juncture of said shank 15 and said shaft 11.

As FIG. 1 of the drawings illustrates, the preferred embodiment of the present deburring drill bit 10 comprises an elongated cylindrical shaft 11, a head 12, forward drilling/cutting surfaces 13, rearward deburring/cutting surfaces 14, and a shank 15. Head 12 has the same circumference as shaft 11, and the longitudinal axis of shaft 11 is offset from the longitudinal axis of head 12, resulting in an angular relationship between shank 15 and head 12 of 5 degrees or less, and a preferred angular relationship of from 1 degree to 3 degrees. Depending on the length of the shaft 11, the bend may be in the shaft 11 or at its juncture with shank 15.

In operation as shown in FIG. 2, the bit 10 is rotated by a drill (not shown) while being held in alignment by a drill bushing 16 having an inner circumference slightly larger than the circumference of head 12, which prevents lateral movement of head 12. The bushing 16 is secured to a drill fixture 20 which maintains alignment of the subject part 17. As the forward drilling surfaces 13 cut an aperture through a subject part 17, the alignment of head 12 which was initiated by the bushing is maintained by the inner circumference of the aperture being drilled. When the aperture is completed, head 12 penetrates through the aperture, and the original rotation of the head 12 is automatically changed to rotation about the longitudinal axis of the shank 15 from rotation about the longitudinal axis of the shaft 11. The bushing 16 forces a specific drilling axis, and as the head 12 penetrates the subject part, the bit 10 springs into its bent alignment. This causes the rearward deburring cutting surfaces 14 to rotate around the inner periphery of the aperture, removing all burrs, and cutting a chamfer in the inner periphery of the aperture.

Figure 3:
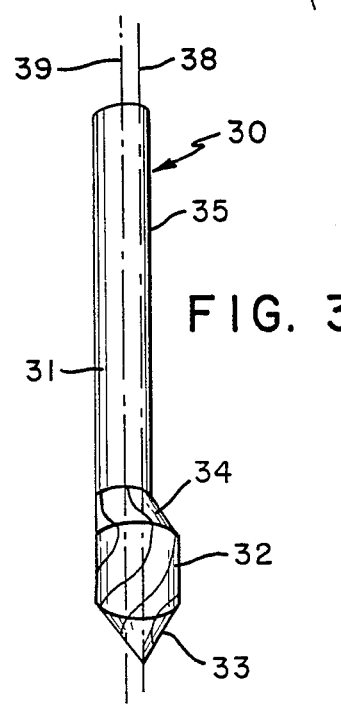
FIG. 3 is a perspective drawing of a second embodiment of the present invention.
Figure 4:
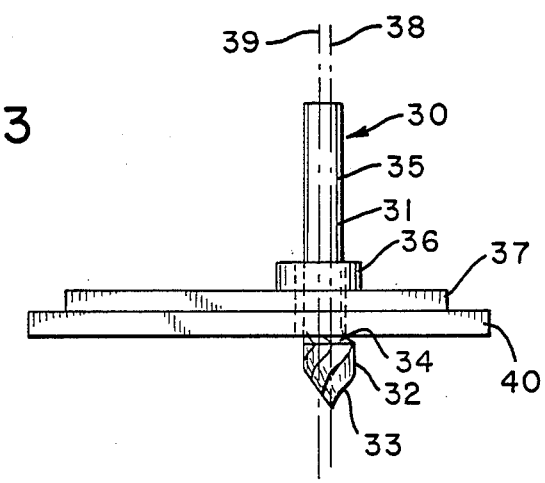
FIG. 4 is a side drawing of a second embodiment of the present invention showing the device in operation.

FIGS. 3 and 4 show the second preferred embodiment 30 which is an apparatus for drilling and deburring an aperture in a single operation comprising: (a) a shank 35 having a first longitudinal axis 38; (b) an elongated shaft 31 secured to said shank 35 and having a second longitudinal axis 39 not coincident with said first longitudinal axis 38; (c) a drill bit head 32 secured to said shaft 31 having a longitudinal axis coincident with the first longitudinal axis of said shank 38, but not coincident with the second longitudinal axis of said shaft 39; (d) drilling surfaces 33 formed in the forward edge of said head 32, said drilling surfaces 33 having a longitudinal axis coincident with said first longitudinal axis 38 of said shank; and (e) deburring surfaces 34 formed in the rearward edge of said head 32, said deburring surfaces 34 having a longitudinal axis coincident with the second longitudinal axis of said shaft 39. The first longitudinal axis 38 is parallel to said second longitudinal axis 39. The head 32 has a circumference larger than the circumference of said shank 35. The head 32 has a circumference larger than the circumference of said shaft 31. The circumference of said shaft 31 is aligned within the circumference of said head 32 except at one point, where they are tangent, resulting in a set off equal to the difference between the diameter of the shaft 31 and the diameter of the head 32.

As FIGS. 3 and 4 illustrate, the second preferred embodiment 30 achieves the dual alignment by having two separate, parallel axes 38 and 39. The first axis 38 is the longitudinal axis of shaft 31 and the second axis 39 is the longitudinal axis of shank 35. In operation, bit 30 is rotated about axis 38 which is controlled by bushing 36. As the forward drilling surfaces complete an aperture through the part 37, the alignment of head 32 changes to a rotation about axis 39, causing the rearward deburring surfaces 34 to rotate around the inner periphery of the aperture, removing the burrs and cutting a chamfer as previously described.

While this invention has been described in detail with particular reference to a preferred embodiment thereof, it will be understood that variations and modifications can be effective within the spirit and scope of the invention as described hereinbefore and as defined in the appended claims. It is understood that the deburring drill bit may be used for drilling and deburring metal and other similar parts.

INDUSTRIAL APPLICABILITY

This invention is capable of exploitation in the machinery industry and is particularly useful in a process for drilling and deburring apertures in metal parts in a single operation.

I claim:

1. Apparatus for drilling and deburring an aperture in a single operation comprising:
   (a) a shank having a first longitudinal axis;
   (b) an elongated shaft secured to said shank and having a second longitudinal axis not coincident with and not parallel to said first longitudinal axis;
   (c) a drill bit head securred to said shaft having a longitudinal axis coincident with said second longitudinal axis;
   (d) drilling surfaces formed in the forward edge of said head, said drilling surfaces having a longitudinal axis coincident with said second longitudinal axis;
   (e) deburring surfaces formed in the side of said shaft, said deburring surfaces having a longitudinal axis coincident with said first longitudinal axis.

2. The apparatus of claim 1 wherein said first longitudinal axis and said second longitudinal axis are angularly disposed up to five degrees from each other.

3. The apparatus of claim 2 wherein said angle is from one degree to three degrees.

4. The apparatus of claim 3 wherein said longitudinal axes intersect at the juncture of said shank and said shaft.

* * * * *